United States Patent
Sadakiyo et al.

(10) Patent No.: US 10,691,124 B2
(45) Date of Patent: Jun. 23, 2020

(54) CONTROL APPARATUS FOR VEHICLE

(71) Applicant: HONDA MOTOR CO., LTD., Tokyo (JP)

(72) Inventors: Masayuki Sadakiyo, Wako (JP); Kentaro Arai, Wako (JP); Hisashi Ishikawa, Wako (JP); Takashi Adachi, Wako (JP); Tomoyuki Noguchi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/275,553

(22) Filed: Feb. 14, 2019

(65) Prior Publication Data
US 2019/0250607 A1 Aug. 15, 2019

(30) Foreign Application Priority Data

Feb. 14, 2018 (JP) .................... 2018-024334

(51) Int. Cl.
| | |
|---|---|
| *F16H 61/02* | (2006.01) |
| *G05D 1/00* | (2006.01) |
| *B60W 10/11* | (2012.01) |
| *B60W 10/04* | (2006.01) |
| *B60W 10/18* | (2012.01) |
| *B60W 10/20* | (2006.01) |
| *B60W 30/18* | (2012.01) |

(Continued)

(52) U.S. Cl.
CPC .......... *G05D 1/0061* (2013.01); *B60W 10/04* (2013.01); *B60W 10/11* (2013.01); *B60W 10/18* (2013.01); *B60W 10/20* (2013.01); *B60W 30/18* (2013.01); *F16H 61/0213* (2013.01); *B60W 2710/1005* (2013.01); *B60W 2720/106* (2013.01); *B60W 2720/24* (2013.01); *F16H 59/18* (2013.01); *F16H 2059/183* (2013.01); *G05B 15/02* (2013.01); *G05D 2201/0213* (2013.01)

(58) Field of Classification Search
CPC ......... F16H 59/0204; F16H 2059/0221; F16H 2061/0012; F16H 2061/0075; F16H 2061/0234; F16H 61/0213; F16H 61/0248; F16H 61/0274; F16H 2300/02; B60W 30/182; B60W 2050/0073; B60W 60/0054
See application file for complete search history.

(56) References Cited

U.S. PATENT DOCUMENTS

| | | | | |
|---|---|---|---|---|
| 6,007,455 | A * | 12/1999 | Steeby | ........... B60W 10/06 477/109 |
| 2010/0294067 | A1* | 11/2010 | Bak | ........... F16H 59/0204 74/473.12 |
| 2017/0299052 | A1* | 10/2017 | Kakihara | ........... F16H 59/18 |

FOREIGN PATENT DOCUMENTS

JP 2017-146819 A 8/2017

* cited by examiner

*Primary Examiner* — Edwin A Young
(74) *Attorney, Agent, or Firm* — Westerman, Hattori, Daniels & Adrian, LLP

(57) ABSTRACT

A control apparatus includes a switching control unit that switches a traveling mode of a vehicle from an automated driving mode to a manual driving mode if an automated drive canceling request to cancel the automated driving mode to switch to the manual driving mode is submitted while the vehicle is traveling in the automated driving mode. The switching control unit performs transmission gear setting control in which a transmission gear of an automatic transmission is set to a highest transmission gear among transmission gears within a range of a predetermined allow- (Continued)

able driving force in the switching from the automated driving mode to the manual driving mode.

10 Claims, 6 Drawing Sheets

(51) Int. Cl.
*F16H 59/18* (2006.01)
*G05B 15/02* (2006.01)

CONTROL APPARATUS FOR VEHICLE

CROSS REFERENCES TO RELATED APPLICATIONS

The present application claims priority under 35 U.S.C. § 119 to Japanese Patent Application No. 2018-024334, filed Feb. 14, 2018, entitled "Control Apparatus for Vehicle." The contents of this application are incorporated herein by reference in their entirety.

TECHNICAL FIELD

The present disclosure relates to a control apparatus for a vehicle. In particular, the present disclosure relates to a control apparatus for a vehicle capable of switching between an automated driving mode and a manual driving mode.

BACKGROUND

For example, as disclosed in Japanese Unexamined Patent Application Publication No. 2017-146819, a vehicle control apparatus has hitherto been proposed in related art, which includes an automated drive control unit that automatically controls at least one of acceleration-deceleration and steering of a host vehicle so that the host vehicle travels along a route to a destination. Such a vehicle control apparatus controls switching between the automated driving mode and the manual driving mode in response to an operation by a crew (driver) of the vehicle with a switching unit (for example, a selector switch).

The inventors found that, when a request to switch from the automated driving mode to the manual driving mode is submitted, setting of an appropriate transmission gear corresponding to the driving force, the accelerator position, and so on of the vehicle at that time is not performed in the related art. Accordingly, performing gear shift control of an automatic transmission in the manual driving mode in the switching from the automated driving mode to the manual driving mode may cause a gear shift shock in transition of the transmission gear. In addition, when the crew (driver) of the vehicle takes over the operation of the vehicle, for example, the degree of operation of a depressing operation of an accelerator pedal may not be appropriate. Consequently, in particular, for example, when a rapid depressing operation of the accelerator pedal is performed by the driver, the driving force of the vehicle becomes too large to rapidly accelerate the vehicle. As a result, the vehicle speed may be disadvantageously rapidly increased or the distance to a vehicle traveling ahead may be disadvantageously decreased.

SUMMARY

It is desirable to provide a control apparatus for a vehicle, which is capable of avoiding a rapid change of acceleration of the vehicle through setting of an appropriate transmission gear in switching from an automated driving mode to a manual driving mode.

One embodiment of the present application describes a control apparatus for a vehicle capable of switching between the automated driving mode and the manual driving mode. In the automated driving mode, among steering and acceleration-deceleration of the vehicle, at least the acceleration-deceleration is automatically controlled. In the manual driving mode, among the steering and the acceleration-deceleration of the vehicle, at least the acceleration-deceleration is controlled based on an operation by a crew. The vehicle includes a stepped automatic transmission that changes rotation caused by driving force transmitted from a driving source to output the rotational driving force to a driving wheel side. The control apparatus includes a switching control unit that switches a traveling mode of the vehicle from the automated driving mode to the manual driving mode if an automated drive canceling request to cancel the automated driving mode to switch to the manual driving mode is submitted while the vehicle is traveling in the automated driving mode. The switching control unit performs transmission gear setting control in which a transmission gear of the automatic transmission is set to a highest transmission gear within a range of a predetermined allowable driving force in the switching from the automated driving mode to the manual driving mode.

With the control apparatus for the vehicle, performing the transmission gear setting control in which the transmission gear of the automatic transmission is set to the highest transmission gear within the range of a predetermined allowable driving force in the switching from the automated driving mode to the manual driving mode enables a change in the driving force of the vehicle after the transition to the manual driving mode to be reduced. Accordingly, since the driving force of the vehicle is prevented from being increased too much, for example, even if the crew rapidly depresses an accelerator pedal, there is no risk of a rapid increase in the vehicle speed or a short distance between the vehicle and a vehicle traveling ahead.

In the control apparatus for the vehicle, the switching control unit may keep the state in which the transmission gear of the automatic transmission is set to the highest transmission gear until a predetermined time elapses since a request to switch from the automated driving mode to the manual driving mode has been submitted.

With the above configuration, since a rapid acceleration of the vehicle is avoided even if the crew rapidly depresses the accelerator pedal after the operation to switch from the automated driving mode to the manual driving mode, it is possible to effectively avoid the disadvantages caused by a rapid change in the driving force of the vehicle in the switching from the automated driving mode to the manual driving mode.

The control apparatus for the vehicle may further include an accelerator operation device used by the crew to operate an accelerator position. The switching control unit may set the transmission gear of the automatic transmission to the highest transmission gear on the condition that a speed of change of the accelerator position based on an operation by the crew with the accelerator operation device is lower than a first predetermined value.

With the above configuration, since the speed of change of the accelerator position is set to a value higher than or equal to the first predetermined value if the crew intentionally rapidly operates the accelerator operation device and the transmission gear setting control in which the transmission gear of the automatic transmission is set to the highest transmission gear is not performed, the acceleration of the vehicle is capable of being appropriately (rapidly) increased in accordance with the intention of the crew. Accordingly, it is possible to perform the control of the driving force, in which the intention of the crew (driver) of the vehicle is appropriately reflected, in the switching to the manual driving mode.

Alternatively, the switching control unit may set the transmission gear of the automatic transmission to the highest transmission gear on the condition that an amount of change of the accelerator position based on an operation by the crew with the accelerator operation device is smaller than a second predetermined value.

With the above configuration, since the amount of change of the accelerator position is set to a value higher than or equal to the second predetermined value if the crew intentionally largely operates the accelerator operation device and the transmission gear setting control in which the transmission gear of the automatic transmission is set to the highest transmission gear is not performed, the acceleration of the vehicle is capable of being appropriately (largely) increased in accordance with the intention of the crew. Accordingly, it is possible to perform the control of the driving force, in which the intention of the crew (driver) of the vehicle is appropriately reflected, in the switching to the manual driving mode.

In the control apparatus for the vehicle, the switching control unit may set the transmission gear of the automatic transmission to the highest transmission gear on the condition that deceleration of the vehicle is not requested in the control of the vehicle in the automated driving mode.

Performing the transmission gear setting control when the deceleration of the vehicle is requested in the control of the vehicle in the automated driving mode may cause the transmission gear to be changed to a higher transmission gear not to ensure the required deceleration. Accordingly, the transition of the transmission gear to a higher transmission gear (up-shift) is avoided when the deceleration of the vehicle is requested by performing the transmission gear setting control on the condition that the deceleration of the vehicle is not requested in the control of the vehicle in the automated driving mode. Consequently, it is possible to ensure the deceleration of the vehicle in the switching from the automated driving mode to the manual driving mode.

In the control apparatus for the vehicle, the switching control unit may set the transmission gear of the automatic transmission to the highest transmission gear on the condition that an accelerator position in the control of the vehicle in the automated driving mode is not fully closed.

When the accelerator position is fully closed in the control of the vehicle in the automated driving mode, it may be considered that it is not necessary to increase the driving force of the vehicle or to rapidly accelerate the vehicle. Accordingly, the transmission gear setting control is performed on the condition that the accelerator position is not fully closed in the control of the vehicle in the automated driving mode.

The control apparatus for the vehicle may further include an operation device for driving mode switching, which is used by the crew to switch between the automated driving mode and the manual driving mode. The switching control unit may determine that the automated drive canceling request is submitted if an operation to switch from the automated driving mode to the manual driving mode is performed in response to an operation by the crew with the operation device for driving mode switching.

According to the control apparatus for the vehicle according to the present disclosure, for example, it is possible to avoid a rapid change of the acceleration of the vehicle through setting of an appropriate transmission gear in the switching from the automated driving mode to the manual driving mode.

BRIEF DESCRIPTION OF THE DRAWINGS

The advantages of the disclosure will become apparent in the following description taken in conjunction with the following drawings.

DETAILED DESCRIPTION

Embodiments of the present disclosure will herein be described with reference to the drawings.

First Embodiment

Figure 1:
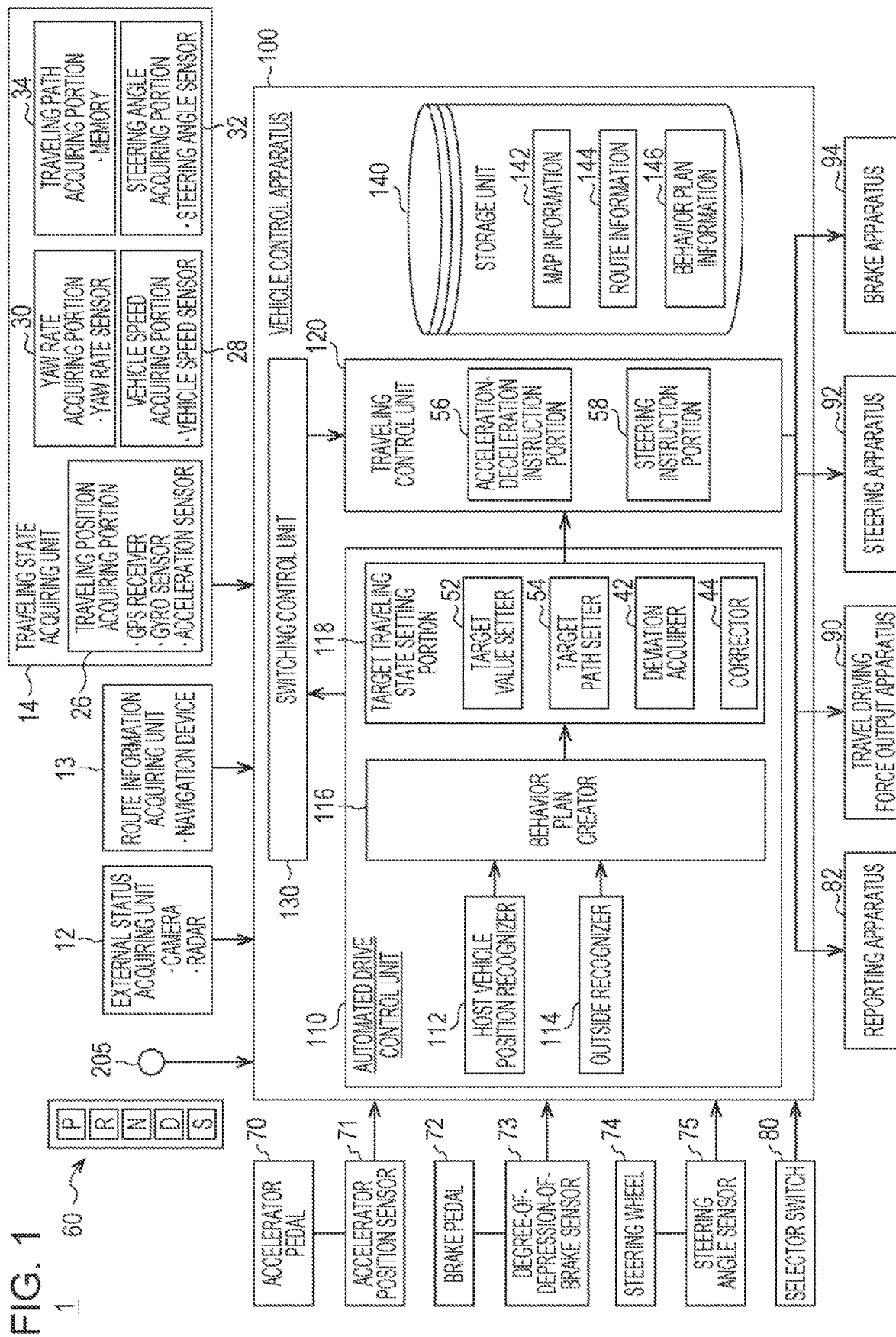
FIG. 1 is a functional configuration diagram of a control apparatus for a vehicle according to an embodiment of the present disclosure.

FIG. 1 is a functional configuration diagram of a control apparatus 100 mounted in a vehicle. The configuration and the function of the control apparatus 100 for a vehicle 1 will be described with reference to FIG. 1. The vehicle (host vehicle) 1 in which the control apparatus 100 is mounted is, for example, a two-wheeled vehicle, a three-wheeled vehicle, or a four-wheeled vehicle and is a car using an internal combustion engine, such as a diesel engine or a gasoline engine, as its power source, an electric car using a motor as its power source, or a hybrid car including both an internal combustion engine and a motor. The electric car described above is driven using electric power discharged from a battery, such as a secondary battery, a hydrogen fuel cell, a metal fuel cell, or an alcohol fuel cell.

The vehicle 1 includes units including an external status acquiring unit 12, a route information acquiring unit 13, and a traveling state acquiring unit 14, which are used to acquire a variety of information from the outside of the vehicle. In addition, the vehicle 1 includes operation devices including an accelerator pedal 70, a brake pedal 72, a steering wheel 74, and a selector switch 80; operation detection sensors including an accelerator position sensor 71, a degree-of-depression-of-brake sensor (brake switch) 73, and a steering angle sensor (steering torque sensor) 75; and a reporting apparatus (output unit) 82. Furthermore, the vehicle 1 includes a travel driving force output apparatus (driving apparatus) 90, a steering apparatus 92, and a brake apparatus 94 as apparatuses used to drive or steer the vehicle and also includes the vehicle control apparatus 100 (the control apparatus 100 of the vehicle 1 is hereinafter referred to as a vehicle control apparatus 100) used to control the above components. Theses apparatuses, units, and devices are connected to each other via a multiplex communication line, such as a controller area network (CAN) communication line, a serial communication line, or a wireless communication network. The exemplified operation devices are only examples and, for example, buttons, dial switches, graphical user interface (GUI) switches may be mounted in the vehicle.

The external status acquiring unit 12 acquires the external status of the vehicle. For example, the external status acquiring unit 12 acquires environmental information around the vehicle, which indicates the lane of the road on which the vehicle is traveling and objects around the vehicle. The external status acquiring unit 12 includes, for example, various cameras (for example, a monocular camera, a stereo camera, and an infrared camera) and various radars (for example, a millimeter-wave radar, a microwave radar, and a laser radar). In addition, the external status acquiring unit 12 may use a fusion sensor that integrates information captured by the camera and information acquired by the radar.

The route information acquiring unit 13 includes a navigation device. The navigation device includes, for example, a global navigation satellite system (GNSS) receiver, map information (navigation map), a touch-panel display, a speaker, and a microphone. The touch-panel display, the speaker, and the microphone function as user interfaces. The navigation device identifies the position of the vehicle using the GNSS receiver to derive the route from the identified position to a destination specified by a user. The route derived by the navigation device is stored in a storage unit 140 as route information 144. The position of the vehicle may be identified or complemented by an inertial navigation system (INS) using an output from the traveling state acquiring unit 14. The navigation device provides audio guidance and/or navigation display of the route to the destination when the vehicle control apparatus 100 is performing a manual driving mode. The component for identifying the position of the vehicle may be provided separately from the navigation device. The navigation device may be realized by one function of a terminal device, such as a smartphone or a tablet of the user. In this case, transmission and reception of information is performed via wireless communication or wired communication between the terminal device and the vehicle control apparatus 100.

The traveling state acquiring unit 14 acquires the current traveling states of the vehicle. The traveling state acquiring unit 14 includes a traveling position acquiring portion 26, a vehicle speed acquiring portion 28, a yaw rate acquiring portion 30, a steering angle acquiring portion 32, and a traveling path acquiring portion 34.

The traveling position acquiring portion 26 acquires the traveling position of the vehicle, which is one of the traveling states, and the orientation (traveling direction) of the vehicle. The traveling position acquiring portion 26 includes a device (for example, a global positioning system (GPS) receiver, a GNSS receiver, or a beacon receiver) which receives electromagnetic waves transmitted from various measuring apparatuses, such as a satellite and a road-side device, to acquire positional information (latitude, longitude, altitude, coordinate, and so on), a gyro sensor, an acceleration sensor, and so on. The traveling position of the vehicle is measured based on a specific portion of the vehicle.

The vehicle speed acquiring portion 28 acquires the speed of the vehicle (hereinafter referred to as a vehicle speed), which is one of the traveling states. The vehicle speed acquiring portion 28 includes, for example, a vehicle speed sensor provided on one or more wheels.

The yaw rate acquiring portion 30 acquires the yaw rate of the vehicle, which is one of the traveling states. The yaw rate acquiring portion 30 includes, for example, a yaw rate sensor.

The steering angle acquiring portion 32 acquires a steering angle, which is one of the traveling states. The steering angle acquiring portion 32 includes a steering angle sensor or the like, which is provided on, for example, a steering shaft. A steering angle speed and a steering angle acceleration are also acquired based on the acquired steering angle here.

The traveling path acquiring portion 34 acquires information about an actual traveling path of the vehicle, which is one of the traveling states. The actual traveling path includes a path (locus) on which the vehicle has actually traveled and may include a path on which the vehicle will travel, for example, an extension at the front side of the traveling direction of the path (locus) on which the vehicle has traveled. The traveling path acquiring portion 34 includes a memory. The positional information about a series of points and lines included in the actual traveling path is stored in the memory. The extension is capable of being estimated using a computer or the like.

The accelerator position sensor 71, the degree-of-depression-of-brake sensor 73, and the steering angle sensor 75, which are the operation detection sensors, supply an accelerator position, a degree of depression of the brake, and a steering angle, respectively to the vehicle control apparatus 100 as results of the detection.

The selector switch 80 is operated by a crew of the vehicle. The selector switch 80 accepts an operation by the crew. The selector switch 80 generates a driving mode specification signal specifying the driving mode of the vehicle from the content of the operation by the crew and supplies the driving mode specification signal to the vehicle control apparatus 100. As described below, a switching control unit 130 in the vehicle control apparatus 100 switches the driving mode (for example, switches between an automated driving mode and the manual driving mode) based on the content of the operation (the content of the driving mode specification signal) accepted by the selector switch 80.

The vehicle 1 of a first embodiment includes a shifter 60 operated by a driver with a shift lever. The positions of the shift lever (not illustrated) in the shifter 60 includes, for example, P (parking), R (reverse drive), N (neutral), D (forward drive in an automatic gear shifting mode (normal mode)), and S (forward drive in a sports mode), as illustrated in FIG. 1. A shift position sensor 205 is provided near the shifter 60. The shift position sensor 205 detects the position of the shift lever operated by the driver. Information about the shift position detected by the shift position sensor 205 is supplied to the vehicle control apparatus 100. In the manual driving mode, the information about the shift position detected by the shift position sensor 205 is directly supplied to the travel driving force output apparatus 90 (an automatic transmission-electronic control unit (AT-ECU) 5).

The reporting apparatus 82 includes various apparatuses capable of outputting information. For example, the reporting apparatus 82 outputs information for prompting the crew of the vehicle to make a transition from the automated driving mode to the manual driving mode. For example, at least one of a speaker, a vibrator, a display device, a luminescent device, and so on is used as the reporting apparatus 82.

Figure 2:
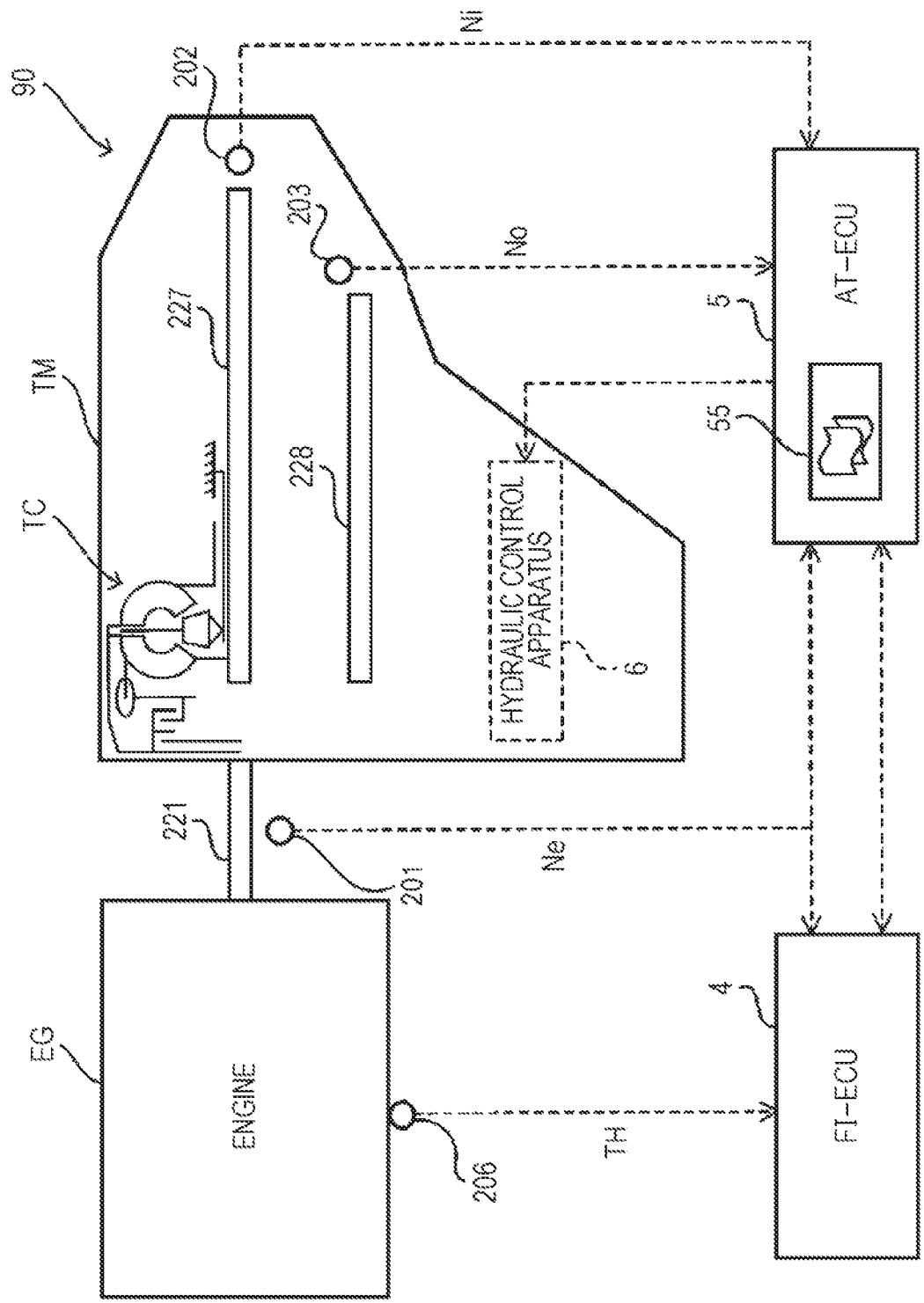
FIG. 2 is a schematic view illustrating the configuration of a travel driving force output apparatus (driving apparatus) included in the vehicle.

In the vehicle of the first embodiment, the travel driving force output apparatus (driving apparatus) 90 includes an engine EG, a fuel injection-electronic control unit (FI-ECU) 4 that controls the engine EG, an automatic transmission TM, and the AT-ECU 5 that controls a torque converter TC and so on in the automatic transmission TM, as illustrated in FIG. 2. When the vehicle is an electric car using a motor as its power source, the travel driving force output apparatus 90 may include a traction motor and a motor ECU that controls the traction motor, in addition to the above components. When the vehicle is a hybrid car, the travel driving force output apparatus 90 may include the engine, an engine ECU, the traction motor, and the motor ECU. When the travel driving force output apparatus 90 is composed of the engine EG and the automatic transmission TM, as in the first embodiment, the FI-ECU 4 and the AT-ECU 5 control a throttle position of the engine EG, a shift gear of the automatic transmission TM, and so on in accordance with information supplied from a traveling control unit 120 described below to output travel driving force (torque) for driving the vehicle. When the travel driving force output apparatus 90 includes only the traction motor, the motor ECU adjusts the duty ratio of a pulse width modulation (PWM) signal to be supplied to the traction motor in accordance with information supplied from the traveling control unit 120 to output the travel driving force described above. When the travel driving force output apparatus 90 includes the engine and the traction motor, both the FI-ECU and the motor ECU cooperatively control the travel driving force in accordance with information supplied from the traveling control unit 120.

The steering apparatus 92 includes, for example, an electric motor. The electric motor exerts force on, for example, a rack-and-pinion mechanism to change the direction of steered wheels. The steering apparatus 92 drives the electric motor in accordance with information supplied from the traveling control unit 120 to change the direction of the steered wheels.

The brake apparatus 94 is an electric servo brake system including, for example, a brake caliper, a cylinder that transmits oil pressure to the brake caliper, an electric motor that causes the cylinder to generate the oil pressure, and a braking controller. The braking controller in the electric servo brake system controls the electric motor in accordance with information supplied from the traveling control unit 120 to supply brake torque (braking force output apparatus) for outputting braking force corresponding to a braking operation to each wheel. The electric servo brake system may include a mechanism that transmits the oil pressure generated by an operation with the brake pedal 72 to the cylinder via a master cylinder as a backup. The brake apparatus 94 is not limited to the electric servo brake system described above and may be an electronically controlled hydraulic brake system. The electronically controlled hydraulic brake system controls an actuator in accordance with information supplied from the traveling control unit 120 to transmit the oil pressure of the master cylinder to the cylinder. The brake apparatus 94 may include a regeneration brake driven by the traction motor when the travel driving force output apparatus 90 includes the traction motor.

The vehicle control apparatus 100 will now be described. The vehicle control apparatus 100 includes an automated drive control unit 110, the traveling control unit 120, the switching control unit 130, and the storage unit 140. The automated drive control unit 110 includes a host vehicle position recognizer 112, an outside recognizer 114, a behavior plan creator 116, and a target traveling state setting portion 118. Each component in the automated drive control unit 110 and part or all of the traveling control unit 120 are realized by a processor, such as a central processing unit (CPU), that executes programs. Part or all of the above components may be realized by hardware, such as a large scale integration (LSI) circuit or an application specific integrated circuit (ASIC). The storage unit 140 is realized by, for example, a read only memory (ROM), a random access memory (RAM), a hard disk drive (HDD), or a flash memory. The programs executed by the processor may be stored in the storage unit 140 in advance or may be downloaded from an external apparatus via in-vehicle Internet equipment. The programs may be installed in the storage unit 140 through loading of a portable storage medium in which the programs are stored into a drive device (not illustrated). The vehicle control apparatus 100 may be distributed among multiple computer apparatuses. In this case, the hardware functional components described above are capable of being cooperated with the software composed of the programs and so on in the in-vehicle computers of the vehicle to realize various processes in the first embodiment.

When the driving mode is switched by the switching control unit 130 in response to a signal supplied from the selector switch 80, the automated drive control unit 110 performs control corresponding to the driving mode after the switching. Although the driving modes includes the driving mode (the automated driving mode) in which the acceleration-deceleration and the steering of the vehicle are automatically controlled and the driving mode (the manual driving mode) in which the acceleration-deceleration of the vehicle is controlled based on an operation with the operation device, such as the accelerator pedal 70 or the brake pedal 72, and the steering is controlled based on an operation with the operation device, such as the steering wheel 74, the driving modes are not limited to these. As another driving mode, for example, the driving mode (a semi-automatic driving mode) may be included, in which one of the acceleration-deceleration and the steering of the vehicle is automatically controlled and the other thereof is controlled based on an operation with the operation device. The "automated drive" in the following description include the semi-automatic driving mode, in addition to the automated driving mode.

In the manual driving mode, the automated drive control unit 110 may stop the operation. In this case, an input signal from the operation detection sensor may be supplied to the traveling control unit 120 or the input signal from the operation detection sensor may be directly supplied to the travel driving force output apparatus 90 (the FI-ECU or the AT-ECU), the steering apparatus 92, or the brake apparatus 94.

The host vehicle position recognizer 112 in the automated drive control unit 110 recognizes the lane (traveling lane) on which the vehicle is traveling and the relative position of the vehicle with respect to the traveling lane based on map information 142 stored in the storage unit 140 and information supplied from the external status acquiring unit 12, the route information acquiring unit 13, or the traveling state acquiring unit 14. The map information 142 is map information that is more accurate than the navigation map in the route information acquiring unit 13 and includes information about the center of the lane or information about the boundary of lanes. More specifically, the map information 142 includes road information, traffic regulation information, address information (address and zip code), facility information, telephone number information, and so on. The road information includes information indicating the kind of the road, such as an express highway, a toll road, a national road, or a state road, and information indicating the number of lanes of the road, the width of each lane, the grade of the road, the position (a three-dimensional coordinate including longitude, latitude, and height) of the road, the curvature of each curve of the lane, the positions of junction points and branch points of the lanes, and road traffic signs. The traffic regulation information includes information about blockade of the lane due to a construction, a traffic accident, traffic jam, or the like.

The host vehicle position recognizer 112 recognizes, for example, the gap between a reference point (for example, the center of gravity) of the vehicle and the center of the traveling lane and the angle of the reference point of the vehicle with respect to a line drawn by connecting the centers of the traveling lane in the traveling direction of the vehicle as the relative position of the vehicle with respect to the traveling lane. The host vehicle position recognizer 112 may recognize, for example, the position of the reference point of the vehicle with respect to any side edge of the current lane, instead of the gap and the angle, as the relative position of the vehicle with respect to the traveling lane.

The outside recognizer 114 recognizes the states, such as the position, the speed, and the acceleration, of a surrounding vehicle based on information supplied from the traveling control unit 120. The surrounding vehicle in the first embodiment is another vehicle that is traveling around the host vehicle and a vehicle that travels in the same direction as that of the host vehicle. The position of the surrounding vehicle may be represented by a representative point, such as the center of gravity or a corner, of the vehicle or may be represented by an area represented by the outline of the vehicle. The "states" of the surrounding vehicle may include the acceleration of the surrounding vehicle, whether the surrounding vehicle is performing lane change, or whether the surrounding vehicle is to perform the lane change based on information supplied from the various units and devices. The outside recognizer 114 may recognize the position of another object, such as a guardrail, a utility pole, a parked vehicle, or a pedestrian, in addition to the surrounding vehicle.

The behavior plan creator 116 sets a start point of the automated drive, a target end point of the automated drive, and/or the destination of the automated drive. The start point of the automated drive may be the current position of the vehicle or may be a point where the crew of the vehicle has performed an operation to instruct the automated drive. The behavior plan creator 116 creates a behavior plan in the interval between the start point and the target end point or the interval between the start point and the destination of the automated drive. The interval in which the behavior plan creator 116 creates the behavior plan is not limited to the above ones and the behavior plan creator 116 may create the behavior plan in an arbitrary interval.

The behavior plan is composed of, for example, multiple events that are sequentially performed. The events include, for example, a deceleration event to decelerate the vehicle, an acceleration event to accelerate the vehicle, a lane keeping event to drive the vehicle so that the vehicle does not deviate from the traveling lane, a lane change event to cause the vehicle to change the traveling lane, an overtaking event to cause the vehicle to overtake a vehicle traveling ahead, a branch event to cause the vehicle to change the lane to a desired lane or drive the vehicle so that the vehicle does not deviate from the current traveling lane at a branch point, and a junction event to accelerate or decelerate the vehicle on a junction lane for joining to the main lane to change the traveling lane. For example, when a junction (branch point) exists on a toll road (for example, an express highway), the vehicle control apparatus 100 changes the lane or keeps the lane so that the vehicle travels in the direction toward the destination.

Accordingly, if it is determined that a junction exists on the route with reference to the map information 142, the behavior plan creator 116 sets the lane change event to change the lane to a desired lane on which the vehicle is capable of traveling to the direction toward the destination between the current position (coordinate) of the vehicle and the position (coordinate) of the junction. Information indicating the behavior plan created by the behavior plan creator 116 is stored in the storage unit 140 as behavior plan information 146.

The target traveling state setting portion 118 sets a target traveling state of the vehicle based on the behavior plan determined by the behavior plan creator 116 and the variety of information acquired by the external status acquiring unit 12, the route information acquiring unit 13, and the traveling state acquiring unit 14. The target traveling state setting portion 118 includes a target value setter 52 and a target path setter 54. The target traveling state setting portion 118 also includes a deviation acquirer 42 and a corrector 44.

The target value setter 52 sets information about the traveling position (latitude, longitude, altitude, coordinate, and so on), to which the vehicle is targeted (such information is also simply referred to as a target position), target value information about the vehicle speed (such information is also simply referred to as a target vehicle speed), and target value information about the yaw rate (such information is also simply referred to as a target yaw rate). The target path setter 54 sets information about a target path of the vehicle (such information is also simply referred to as a target path) based on the external status acquired by the external status acquiring unit 12 and traveling route information acquired by the route information acquiring unit 13. The target path includes information about the target position every unit time. Information about the orientation (the traveling direction) of the vehicle is associated with each target position. Target value information about, for example, the vehicle speed, the acceleration, the yaw rate, lateral acceleration, the steering, the steering angle speed, or the steering angle acceleration, may be associated with each target position. The target position, the target vehicle speed, the target yaw rate, and the target path described above are pieces of information indicating the target traveling state.

The deviation acquirer 42 acquires the deviation of an actual traveling state from the target traveling state based on the target traveling state set by the target traveling state setting portion 118 and the actual traveling state acquired by the traveling state acquiring unit 14.

The corrector 44 corrects the target traveling state in accordance with the deviation acquired by the deviation acquirer 42. Specifically, the corrector 44 makes the target traveling state set by the target traveling state setting portion 118 closer to the actual traveling state acquired by the traveling state acquiring unit 14 with the increasing deviation to set a new target traveling state.

The traveling control unit 120 controls the traveling of the vehicle. Specifically, the traveling control unit 120 outputs an instruction value of traveling control so that the traveling state of the vehicle coincides with or is made close to the target traveling state set by the target traveling state setting portion 118 or the new target traveling state set by the corrector 44. The traveling control unit 120 includes an acceleration-deceleration instruction portion 56 and a steering instruction portion 58.

The acceleration-deceleration instruction portion 56 performs acceleration-deceleration control in the traveling control of the vehicle. Specifically, the acceleration-deceleration instruction portion 56 calculates an acceleration-deceleration instruction value for matching the traveling state of the vehicle with the target traveling state based on the target traveling state (target acceleration-deceleration) set by the target traveling state setting portion 118 or the corrector 44 and the actual traveling state (actual acceleration-deceleration).

The steering instruction portion 58 performs steering control in the traveling control of the vehicle. Specifically, the steering instruction portion 58 calculates an steering angle speed instruction value for matching the traveling state of the vehicle with the target traveling state based on the target traveling state set by the target traveling state setting portion 118 or the corrector 44 and the actual traveling state.

The switching control unit 130 switches the driving mode based on the content of the signal (the driving mode specification signal) from the selector switch 80. If a predetermined condition is met in the switching from the automated driving mode to the manual driving mode, the switching control unit 130 performs control in which the transmission gear of the automatic transmission TM is changed to the highest transmission gear within a range that meets a predetermined allowable driving force (refer to FIG. 3 to FIG. 5 described below).

FIG. 2 is a schematic view illustrating the configuration of the travel driving force output apparatus (driving apparatus) 90 included in the vehicle 1. Referring to FIG. 2, the travel driving force output apparatus 90 of the vehicle 1 of the first embodiment includes the internal combustion engine (engine) EG, which is a driving source, and the automatic transmission TM connected to the engine EG via the torque converter TC with a lockup clutch. The automatic transmission TM changes the rotation caused by the driving force transmitted from the engine EG to output the rotational driving force to a driving wheel side. The automatic transmission TM is a stepped automatic transmission capable of setting multiple transmission gears for forward drive and one transmission gear for reverse drive. In addition, the travel driving force output apparatus 90 includes the FI-ECU 4 that electronically controls the engine EG, the AT-ECU 5 that electronically controls the automatic transmission TM including the torque converter TC, and a hydraulic control apparatus 6 that hydraulically controls rotational driving and lockup of the torque converter TC and fastening (engagement) and release of multiple friction engagement mechanisms in the automatic transmission TM under the control of the AT-ECU 5.

The rotational output from the engine EG is supplied to a crank shaft (an output shaft of the engine EG) 221 and is transmitted to an input shaft 227 of the automatic transmission TM via the torque converter TC.

A crank-shaft rotation speed sensor 201 that detects a rotation speed Ne of the crank shaft 221 (the engine EG) is provided. In addition, an input-shaft rotation speed sensor 202 that detects a rotation speed Ni of the input shaft 227 (an input shaft rotation speed of the automatic transmission TM) is provided. Furthermore, an output-shaft rotation speed sensor 203 that detects a rotation speed No of an output shaft 228 (an output shaft rotation speed of the automatic transmission TM) is provided. The pieces of rotation speed data Ne, Ni, and No, which are detected by the respective sensors 201 to 203, and vehicle speed data calculated from the rotation speed No are supplied to the AT-ECU 5. The rotation speed data Ne of the engine EG is also supplied to the FI-ECU 4. Furthermore, a throttle position sensor 206 that detects a throttle position TH of the engine EG is provided. Data about the throttle position TH is supplied to the FI-ECU 4.

The AT-ECU 5, which controls the automatic transmission TM, includes shift maps (gear shift characteristics) 55. The area of the transmission gears, which is capable of being set in the automatic transmission TM in accordance with the vehicle speed detected by the vehicle speed sensor and the accelerator position detected by the accelerator position sensor 71, is defined in the shift maps 55. The shift maps 55 include shift-up lines and shift-down lines set for the respective transmission gears and the shift maps of multiple kinds having different characteristics are prepared in advance. In gear shift control of the automatic transmission TM, the AT-ECU 5 switches the transmission gear of the automatic transmission TM in accordance with the shift map selected from the shift maps of multiple kinds.

[Outline of Automated Drive Control]

In the vehicle, when the automated driving mode is selected in response to an operation by the driver with the selector switch 80, the automated drive control unit 110 performs automated drive control of the vehicle. In the automated drive control, the automated drive control unit 110 acquires the current traveling states (the actual traveling path, the traveling position, and so on) of the vehicle based on the information acquired from, for example, the external status acquiring unit 12, the route information acquiring unit 13, and the traveling state acquiring unit 14 or the information recognized by the host vehicle position recognizer 112 and the outside recognizer 114. The target traveling state setting portion 118 sets the target traveling state (the target path or the target position), which is the traveling state of the vehicle, based on the behavior plan created by the behavior plan creator 116. The deviation acquirer 42 acquires the deviation of the actual traveling state from the target traveling state. When the deviation is acquired by the deviation acquirer 42, the traveling control unit 120 performs the traveling control so that the traveling state of the vehicle coincides with or is made close to the target traveling state.

The corrector 44 corrects the target path or the target position based on the traveling position acquired by the traveling position acquiring portion 26. The traveling control unit 120 performs the acceleration-deceleration control of the vehicle by the travel driving force output apparatus 90 and the brake apparatus 94 based on the vehicle speed acquired by the vehicle speed acquiring portion 28 or the like so that the vehicle tracks a new target path or a new target position.

In addition, the corrector 44 corrects the target path based on the traveling position acquired by the traveling position acquiring portion 26. The traveling control unit 120 performs the steering control by the steering apparatus 92 based on the steering angle speed acquired by the steering angle acquiring portion 32 so that the vehicle track a new target path.

[Transmission Gear Setting Control in Switching of Driving Mode]

The vehicle control apparatus 100 of the first embodiment performs the control in which the transmission gear of the automatic transmission TM is set to the highest transmission gear within the range of a predetermined allowable driving force (such control is hereinafter referred to as "transmission gear setting control") in the switching from the automated driving mode to the manual driving mode. The transmission gear setting control will now be described.

Figure 3:
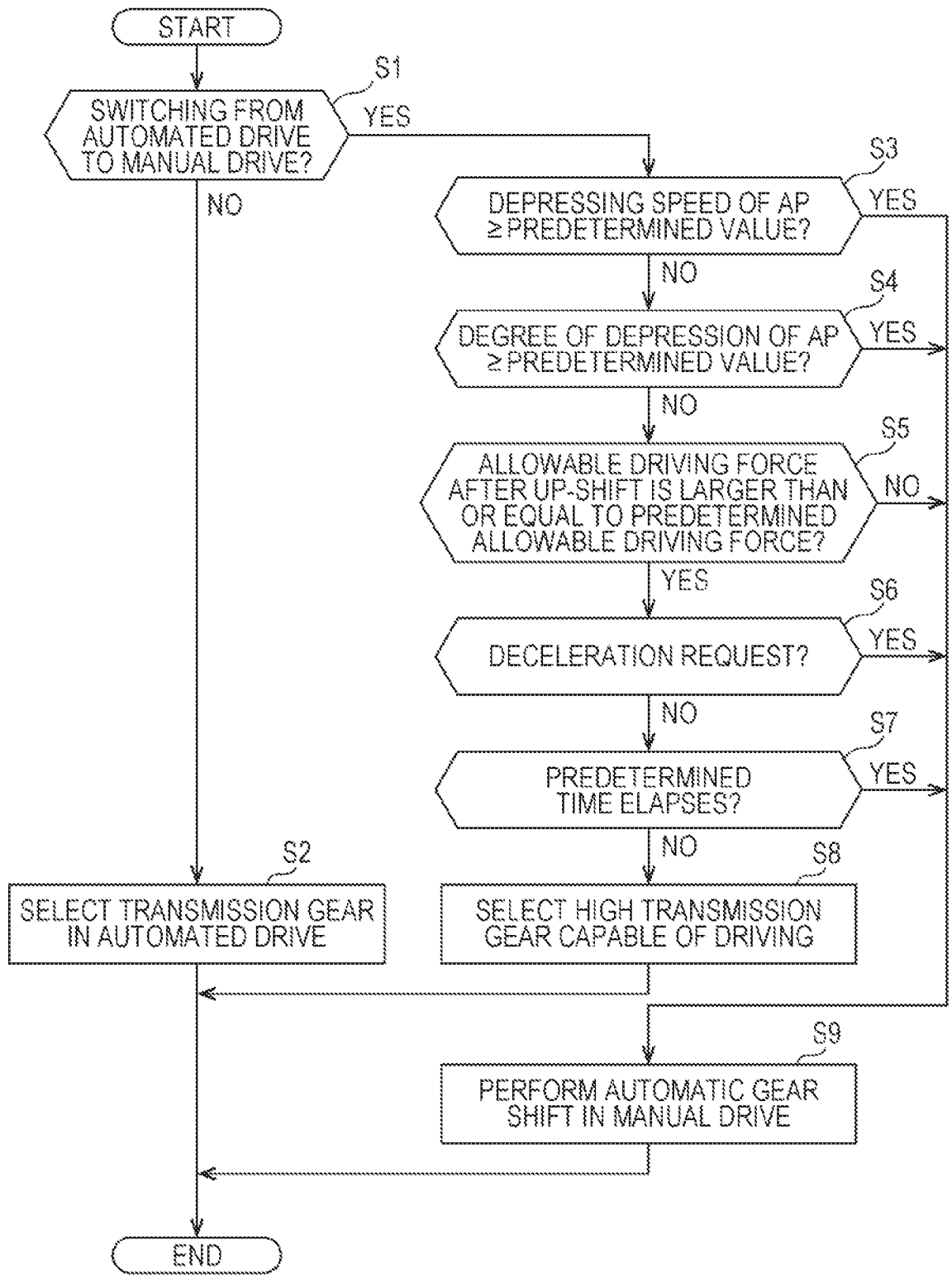
FIG. 3 is a flowchart illustrating an operational process of the control apparatus for the vehicle in switching from an automated driving mode to a manual driving mode in a first embodiment.

FIG. 3 is a flowchart illustrating an operational process of the vehicle control apparatus 100 in the switching from the automated driving mode to the manual driving mode in the first embodiment. Steps S1 to S9 in FIG. 3 are repeated every predetermined period.

Referring to FIG. 3, in Step S1, the switching control unit 130 determines whether a request to switch from the automated driving mode to the manual driving mode is submitted, that is, whether a signal is supplied from the selector switch 80, in the automated drive control of the vehicle. In the first embodiment, the switching control unit 130 determines that the request to switch from the automated driving mode to the manual driving mode (an automated drive canceling request) is submitted when an operation to switch from the automated driving mode to the manual driving mode is performed in response to an operation by the crew (driver) of the vehicle 1 with the selector switch 80. If no signal is supplied from the selector switch 80 (NO in Step S1), the switching control unit 130 continuously performs the automated driving mode. In Step S2, the switching control unit 130 selects the transmission gear selected in the automated drive control unit 110 in the automated driving mode.

If a signal is supplied from the selector switch 80 (YES in Step S1), in Step S3, the switching control unit 130 determines whether the speed of change of the accelerator position detected by the accelerator position sensor 71, that is, the depressing speed of the accelerator pedal 70 by the crew is higher than or equal to a predetermined value (a first predetermined value). If the depressing speed of the accelerator pedal 70 by the crew is higher than or equal to the predetermined value (the first predetermined value) (YES in Step S3), the process goes to Step S9.

In Step S9, the switching control unit 130 performs automatic gear shift control of the automatic transmission TM in the manual driving mode.

If the depressing speed of the accelerator pedal 70 by the crew is lower than the predetermined value (NO in Step S3), in Step S4, the switching control unit 130 determines whether the amount of change of the accelerator position detected by the accelerator position sensor 71, that is, the degree of depression of the accelerator pedal 70 by the crew is higher than or equal to a predetermined value (a second predetermined value). If the degree of depression of the accelerator pedal 70 by the crew is higher than or equal to the predetermined value (the second predetermined value) (YES in Step S4), the process goes to Step S9.

If the degree of depression of the accelerator pedal 70 by the crew is lower than the predetermined value (NO in Step S4), in Step S5, the switching control unit 130 determines whether, in up-shift of the transmission gear (when the transmission gear is an N-th gear, switching from the N-th gear to an N+1-th or higher transmission gear (high transmission gear)), an allowable driving force at the transmission gear after the up-shift is larger than or equal to a predetermined allowable driving force. If the allowable driving force at the transmission gear after the up-shift is larger than or equal to the predetermined allowable driving force (YES in Step S5), the process goes to Step S6. If the allowable driving force at the transmission gear after the up-shift is smaller than the predetermined allowable driving force (NO in Step S5), the process goes to Step S9.

Figure 4:
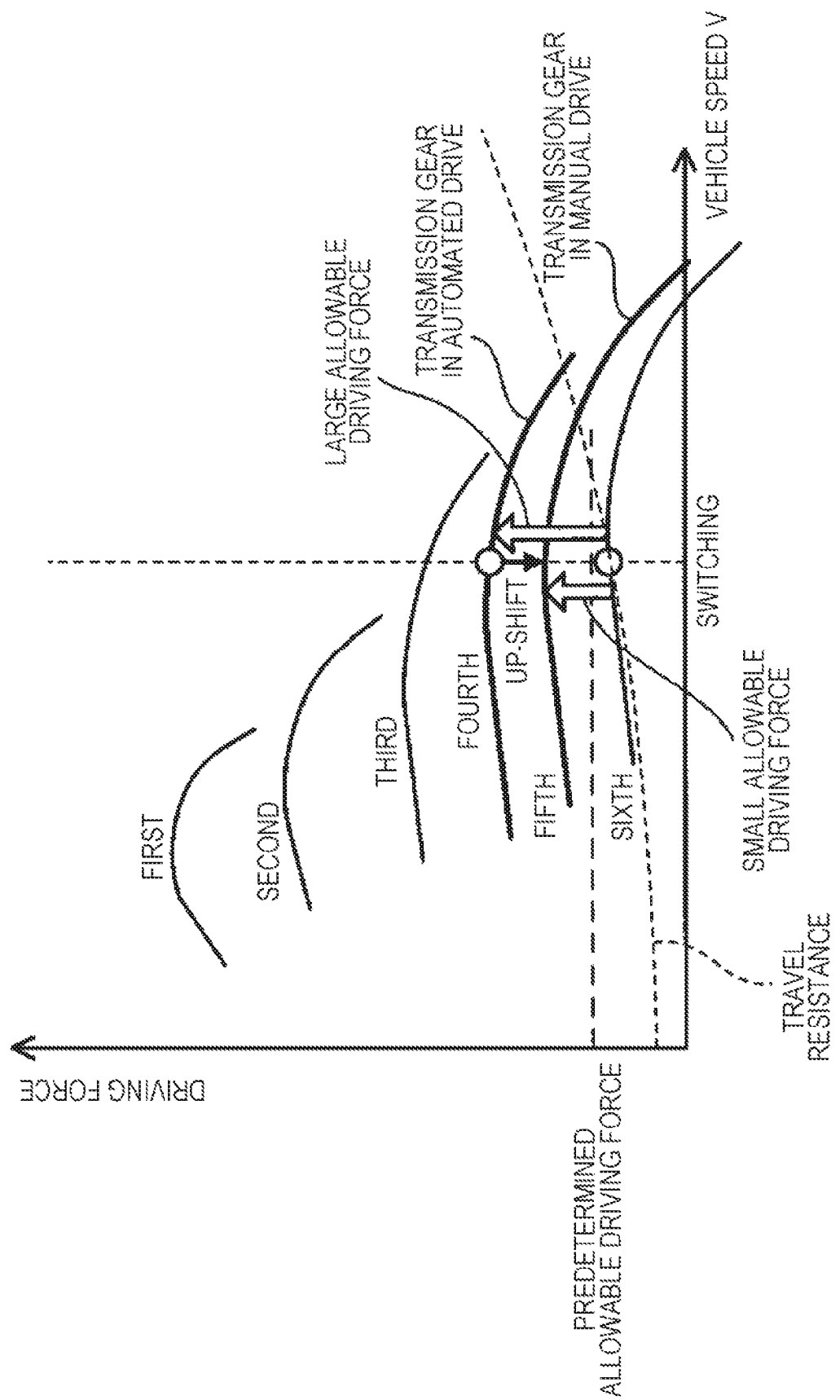
FIG. 4 is a graph illustrating an example of the relationship between a vehicle speed of the vehicle and driving force at each transmission gear.

FIG. 4 is a graph (traveling performance curve diagram) illustrating an example of the relationship between a vehicle speed V of the vehicle and the driving force at each transmission gear. Referring to FIG. 4, the horizontal axis represents the speed (the vehicle speed V) of the vehicle and the vertical axis represents the driving force. As illustrated in FIG. 4, the transmission gears at the lower speed side, among the transmission gears of the automatic transmission TM, have higher driving forces and the transmission gears at the higher speed side, among the transmission gears of the automatic transmission TM, have lower driving forces. Specifically, the first transmission gear has the highest driving force, and the driving force at the second transmission gear is lower than the driving force at the first transmission gear. The driving force at the third transmission gear is lower than the driving force at the second transmission gear, the driving force at the fourth transmission gear is lower than the driving force at the third transmission gear, and the driving force at the fifth transmission gear is lower than the driving force at the fourth transmission gear. The sixth transmission gear has the lowest driving force. However, the first transmission gear has the lowest vehicle speed V (the lowest maximum speed) and the sixth transmission gear has the highest vehicle speed V (the highest maximum speed).

The torque generated in the engine EG is amplified via the automatic transmission TM and so on until the torque is transmitted from the driving wheels to the road surface to be changed to the driving force of the vehicle. The relationship between the driving force and the speed (the vehicle speed V) is illustrated in the traveling performance curve diagram. The traveling performance curve diagram indicates the relationship between the driving force at a certain transmission gear and travel resistance at a certain grade. The travel resistance is calculated by adding "rolling resistance", "air resistance", and "grade resistance" together. The difference between the driving force and the travel resistance is referred to as the allowable driving force. When the allowable driving force exists, the vehicle is capable of being further accelerated.

In the example illustrated in FIG. 4, it is assumed that the fourth transmission gear is used when the automated driving mode is performed (in the gear shift control in the automated driving mode). In this case, the allowable driving force (the difference between the driving force and the travel resistance) is large. As a result, when the accelerator pedal of the vehicle is being depressed by the crew, the vehicle may be rapidly accelerated after transition to the gear shift control in the manual driving mode. Accordingly, in the first embodiment, in order to decrease the allowable driving force in the switching from the automated driving mode to the manual driving mode, the switching control unit 130 performs the up-shift of the transmission gear of the automatic transmission TM (changes the transmission gear of the automatic transmission TM to a higher transmission gear). In the example illustrated in FIG. 4, the fourth transmission gear is up-shifted to the fifth transmission gear. The allowable driving force at the fifth transmission gear is lower than the allowable driving force at the fourth transmission gear.

The predetermined allowable driving force is the driving force that is set in advance. Since appropriate acceleration is not achieved even if the crew depresses the accelerator pedal 70 to attempt to accelerate the vehicle when the allowable driving force is very low or no allowable driving force exists, the operation by the crew with the accelerator pedal 70 may not be appropriately reflected in the control of the driving force of the vehicle or appropriate vehicle speed may not be achieved. Accordingly, in the first embodiment, in order to ensure the least allowable driving force (predetermined allowable driving force) even after the up-shift, it is determined in Step S5 whether the allowable driving force at the transmission gear after the up-shift is larger than or equal to the predetermined allowable driving force. The up-shift is performed on the condition that the allowable driving force is larger than or equal to the predetermined allowable driving force.

The switching control unit 130 calculates the travel resistance from, for example, the grade of the road in Step S5. The switching control unit 130 calculates the allowable driving force by calculating the difference between the driving force and the travel resistance. Then, the switching control unit 130 determines whether the allowable driving force calculated in the above manner is larger than or equal to the predetermined allowable driving force. The switching control unit 130 may calculate the travel resistance from, for example, grade data at a certain vehicle speed and at a certain accelerator position (or a certain throttle position) based on a previous test or the like.

Referring back to FIG. 3, in Step S6, the switching control unit 130 determines whether a deceleration request of the vehicle is submitted in the automated drive control by the automated drive control unit 110 in the switching from the automated driving mode to the manual driving mode. If the deceleration request of the vehicle is submitted in the automated drive control (YES in Step S6), the process goes to Step S9.

If the deceleration request of the vehicle is not submitted in the automated drive control (NO in Step S6), in Step S7, the switching control unit 130 determines whether a predetermined time elapses since the switching operation from the automated driving mode to the manual driving mode (the operation by the crew with the selector switch 80) has been performed. If the switching control unit 130 determines that a predetermined time does not elapse (NO in Step S7), in Step S8, the switching control unit 130 selects the high transmission gear capable of driving (the highest transmission gear within the range of the predetermined allowable driving force) as the transmission gear of the automatic transmission TM. The high transmission gear is selected (set) until a predetermined time elapses since the switching operation from the automated driving mode to the manual driving mode has been performed and the state in which the transmission gear is changed to the selected transmission gear is kept.

If the switching control unit 130 determines that a predetermined time elapses since the switching operation from the automated driving mode to the manual driving mode has been performed (YES in Step S7), the process goes to Step S9.

In Step S9, the switching control unit 130 performs the automatic gear shift control of the automatic transmission TM in the manual driving mode, as described above.

Figure 5:
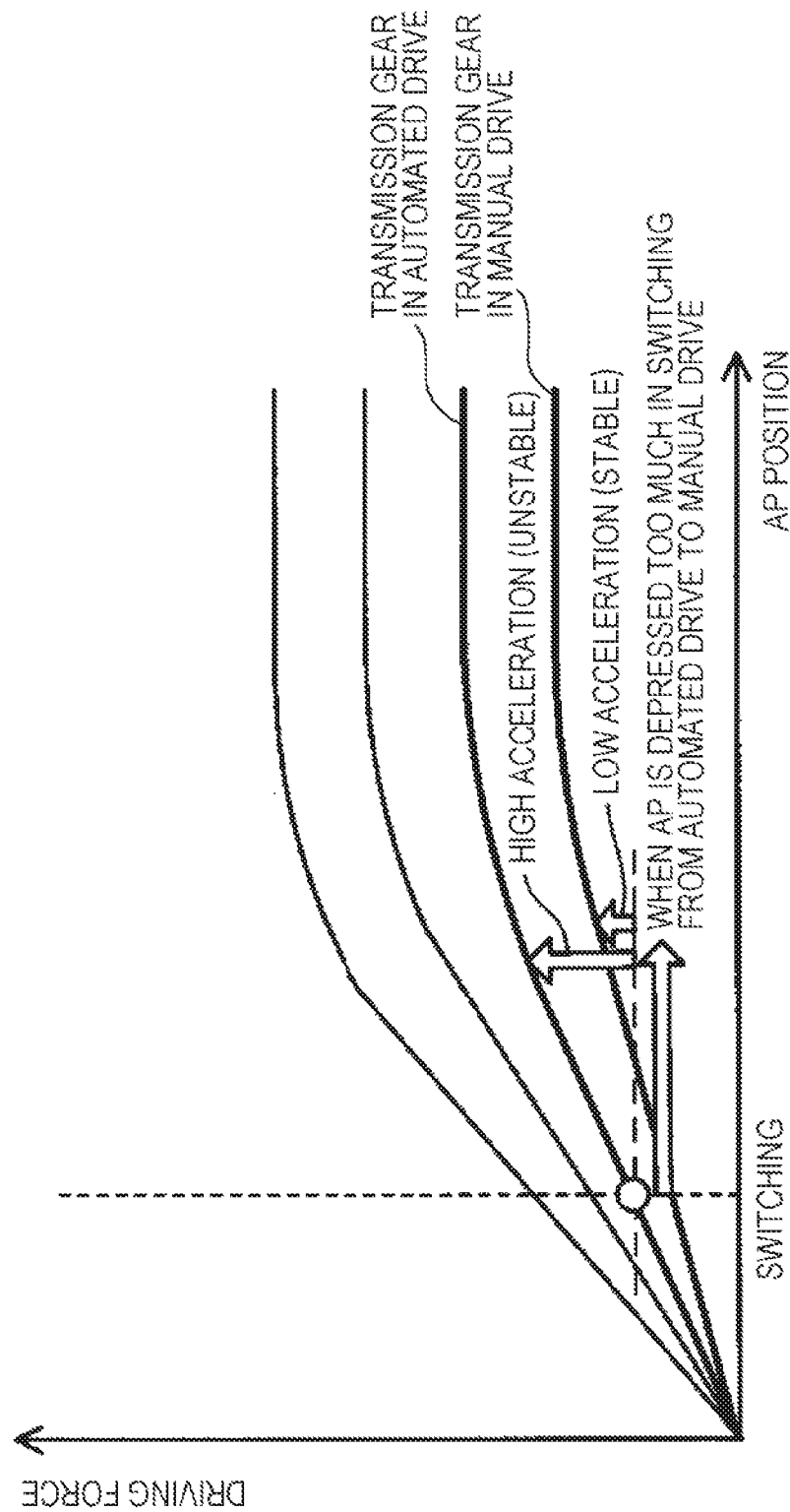
FIG. 5 is a graph illustrating an example of the relationship between the position of an accelerator pedal of the vehicle and the driving force at each transmission gear.

FIG. 5 is a graph illustrating an example of the relationship between the position of the accelerator pedal of the vehicle and the driving force at each transmission gear. Referring to FIG. 5, the horizontal axis represents the position of the accelerator pedal 70 and the vertical axis represents the driving force. As illustrated in FIG. 5, the transmission gears at the lower speed side, among the transmission gears of the automatic transmission TM, have larger gradients of the curve of the driving force (larger driving force gains) with respect to the position of the accelerator pedal 70 and the transmission gears at the higher speed side, among the transmission gears of the automatic transmission TM, have smaller gradients of the curve of the driving force with respect to the position of the accelerator pedal 70. Accordingly, performing the up-shift of the transmission gear by the switching control unit 130 in the switching from the automated driving mode to the manual driving mode enables the change in the acceleration to be suppressed even if the crew depresses the accelerator pedal 70 too much.

The switching control unit 130 supplies an instruction signal indicating the transmission gear selected in each of Steps S2, S8, and S9 to the AT-ECU 5 in the travel driving force output apparatus 90 via the traveling control unit 120.

The AT-ECU 5 performs the gear shift control of the automatic transmission TM based on the instruction signal.

As described above, in the transmission gear setting control by the vehicle control apparatus 100 of the first embodiment, since the switching control unit 130 performs the control in which the transmission gear of the automatic transmission TM is changed to the highest transmission gear within the range of the predetermined allowable driving force in the switching from the automated driving mode to the manual driving mode, it is possible to avoid a rapid change of the acceleration of the vehicle even if the crew rapidly depresses the accelerator pedal 70.

In addition, in the first embodiment, since the switching control unit 130 keeps the state in which the transmission gear is changed to the highest transmission gear until a predetermined time elapses since the switching from the automated driving mode to the manual driving mode has been performed, rapid acceleration of the vehicle is avoided even if the crew depresses the accelerator pedal 70 after the switching operation from the automated driving mode to the manual driving mode. Accordingly, it is possible to effectively avoid the disadvantages caused by a rapid change of the driving force of the vehicle in the switching from the automated driving mode to the manual driving mode.

Furthermore, in the first embodiment, since the switching control unit 130 changes the transmission gear to the highest transmission gear within the range of the predetermined allowable driving force on the condition that the depressing speed of the accelerator pedal 70 by the crew is lower than the first predetermined value, the acceleration of the vehicle is capable of being increased if the crew intentionally rapidly depresses the accelerator pedal 70. Accordingly, it is possible to perform the control of the driving force, in which the intention of the crew (driver) of the vehicle is appropriately reflected, in the switching to the manual driving mode.

Furthermore, in the first embodiment, since the switching control unit 130 changes the transmission gear to the highest transmission gear within the range of the predetermined allowable driving force on the condition that the degree of depression of the accelerator pedal 70 by the crew is lower than the second predetermined value, the acceleration of the vehicle is capable of being increased if the crew intentionally rapidly depresses the accelerator pedal 70. Accordingly, it is possible to perform the control of the driving force, in which the intention of the crew (driver) of the vehicle is appropriately reflected, in the switching to the manual driving mode.

Furthermore, in the first embodiment, since the switching control unit 130 changes the transmission gear to the highest transmission gear within the range of the predetermined allowable driving force on the condition that the deceleration of the vehicle is not requested in the automated drive control, it is possible to avoid a decrease in the deceleration due to the transition to the higher transmission gear (the up-shift) in a status in which the deceleration is required.

Second Embodiment

Next, a second embodiment of the present disclosure will now be described. The same reference numerals are used in the description of the second embodiment and the corresponding diagrams to identify the same components as in the first embodiment or the corresponding components in the first embodiment. A detailed description of such components is omitted herein. Matters other than the matters described below and matters that are not illustrated in the following drawings are the same as those in the first embodiment.

Figure 6:
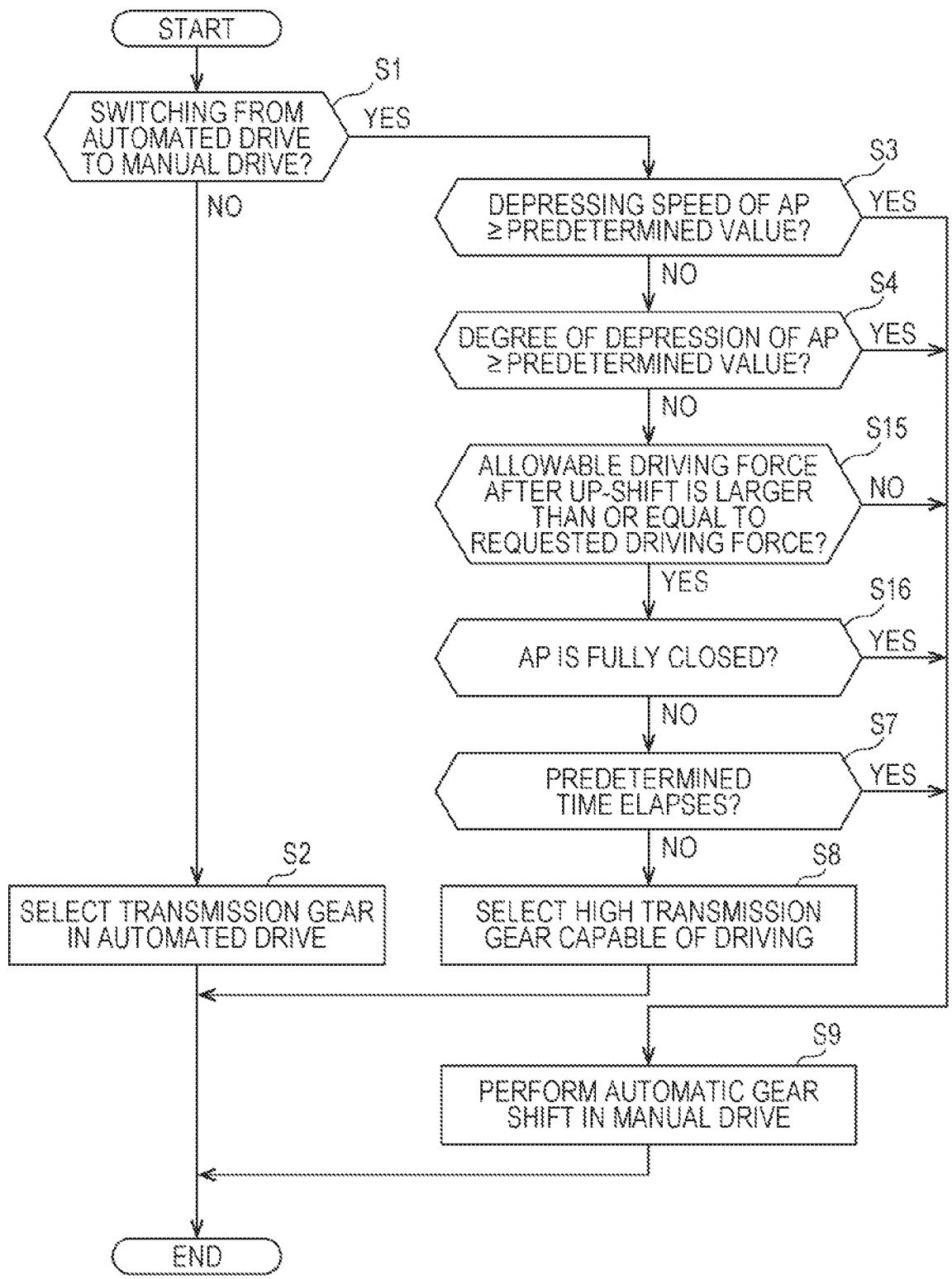
FIG. 6 is a flowchart illustrating an operational process of the control apparatus for the vehicle in the switching from the automated driving mode to the manual driving mode in a second embodiment.

FIG. 6 is a flowchart illustrating an operational process of the vehicle control apparatus 100 in the switching from the automated driving mode to the manual driving mode in the second embodiment of the present disclosure. Since the steps other than Step S1, Step S15, and Step S16 in FIG. 6 are the same as those in the first embodiment described above with reference to FIG. 3, a duplicated description of such steps is omitted herein.

It is determined in Step S1 whether the request to switch from the automated drive to the manual drive is submitted based on whether an operation by the crew with the selector switch 80 is performed in the first embodiment while it is determined in Step S1 whether the request to switch from the automated drive to the manual drive is submitted based on whether an operation by the crew (driver) with an operation device, such as the accelerator pedal 70, is performed during the traveling of the vehicle in the automated driving mode in the second embodiment.

Specifically, operating an operation device, such as the accelerator pedal 70 or the brake pedal 72, by the crew when the automated drive control is performed (when the automated driving mode is selected) gives priority to the behavior in response to the operation with the operation device over the behavior in the automated drive control. This is referred to as override. Accordingly, it is determined that the request to switch from the automated driving mode to the manual driving mode is submitted on the condition of the override in the second embodiment.

In Step S15 in FIG. 6, the switching control unit 130 determines whether the allowable driving force after the up-shift is larger than or equal to a requested driving force. The requested driving force is the driving force requested by the crew (driver) of the vehicle and is calculated based on the depressing operation of the accelerator pedal 70 by the crew. If the switching control unit 130 determines that the allowable driving force after the up-shift is small than the requested driving force (NO Step S15), the process goes to Step S9. If the switching control unit 130 determines that the allowable driving force after the up-shift is larger than or equal to the requested driving force (YES Step S15), in Step S16, the switching control unit 130 determines whether the accelerator position (the throttle position) in the automated drive control is fully closed. If the switching control unit 130 determines that the accelerator position in the automated drive control is fully closed (YES in Step S16), the process goes to Step S9. If the switching control unit 130 determines that the accelerator position in the automated drive control is not fully closed (NO in Step S16), the process goes to Step S7.

As described above, in the second embodiment, the switching control unit 130 changes the transmission gear to the highest transmission gear within the range of the requested driving force on the condition that the allowable driving force after the up-shift is larger than or equal to the requested driving force. With this configuration, since the up-shift is performed only when the requested driving force is capable of being output, it is possible to avoid rapid acceleration of the vehicle, as in the first embodiment. In addition, the switching control unit 130 changes the transmission gear to the highest transmission gear within the range of the requested driving force on the condition that the accelerator position in the automated drive control is not fully closed. If the accelerator position in the control of the vehicle in the automated driving mode is fully closed, it may be determined that it is not necessary to increase the driving force of the vehicle or to rapidly accelerate the vehicle. Accordingly, the transmission gear setting control is performed on the condition that the accelerator position in the control of the vehicle in the automated driving mode is not fully closed.

In addition, in the second embodiment, the switching control unit 130 is capable of setting the transmission gear of the automatic transmission TM to a higher transmission gear (performing the up-shift) in order to suppress a rapid change of the acceleration if the acceleration level in the automated drive control is, for example, about "10" and the acceleration request by the depressing operation by the crew with the accelerator pedal 70 is a request for a level lower than or equal to the level of the acceleration in the automated drive control (for example, the acceleration level is about "2") when the override is performed while the vehicle is traveling in the automated driving mode. In addition, the switching control unit 130 is capable of setting the transmission gear of the automatic transmission TM to a higher transmission gear (performing the up-shift) in order to suppress a rapid change of the acceleration also if the acceleration level in the automated drive control is, for example, about "2" and the acceleration request by the depressing operation by the crew with the accelerator pedal 70 is a request for a level higher than or equal to the level of the acceleration in the automated drive control (for example, the acceleration level is about "4") when the override is performed.

Although the embodiments of the present disclosure are described above, the present disclosure is not limited to the above embodiments. Various modifications are available within the scope of the claims and within the spirit and scope of technical concepts described in the specification and the drawings.

Although the switching control unit 130 is provided separately from the automated drive control unit 110 and the traveling control unit 120 in the above embodiments, the switching control unit 130 may be included in the automated drive control unit 110 or the traveling control unit 120. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A control apparatus for a vehicle capable of switching between an automated driving mode in which, among steering and acceleration-deceleration of the vehicle, at least the acceleration-deceleration is automatically controlled and a manual driving mode in which, among the steering and the acceleration-deceleration of the vehicle, at least the acceleration-deceleration is controlled based on an operation by an operator, wherein the vehicle includes a stepped automatic transmission that changes rotation caused by driving force transmitted from a driving source to output the rotational driving force to a driving wheel side, the control apparatus comprising:
a switching controller that switches a traveling mode of the vehicle from the automated driving mode to the manual driving mode when an automated drive canceling request to cancel the automated driving mode to switch to the manual driving mode is submitted while the vehicle is traveling in the automated driving mode, wherein the switching controller performs transmission gear setting control in which a transmission gear of the automatic transmission is set to a highest transmission gear among transmission gears within a range of a predetermined allowable driving force when switching the traveling mode of the vehicle from the automated driving mode to the manual driving mode.

2. The control apparatus for the vehicle according to claim 1,
wherein the switching controller keeps the state in which the transmission gear of the automatic transmission is set to the highest transmission gear until a predetermined time elapses since the automated drive canceling request has been submitted.

3. The control apparatus for the vehicle according to claim 1, further comprising:
an accelerator operation device used by the operator to operate an accelerator position,
wherein the switching controller sets the transmission gear of the automatic transmission to the highest transmission gear on the condition that a speed of change of the accelerator position caused by an operation by the operator with the accelerator operation device is lower than a first predetermined value.

4. The control apparatus for the vehicle according to claim 1, further comprising:
an accelerator operation device used by the operator to operate an accelerator position,
wherein the switching controller sets the transmission gear of the automatic transmission to the highest transmission gear on the condition that an amount of change of the accelerator position caused by an operation by the operator with the accelerator operation device is smaller than a second predetermined value.

5. The control apparatus for the vehicle according to claim 1,
wherein the switching controller sets the transmission gear of the automatic transmission to the highest transmission gear on the condition that deceleration of the vehicle is not being requested in the control of the vehicle in the automated driving mode.

6. The control apparatus for the vehicle according to claim 1,
wherein the switching controller sets the transmission gear of the automatic transmission to the highest transmission gear on the condition that an accelerator position in the control of the vehicle in the automated driving mode is not being in a fully-closed position.

7. The control apparatus for the vehicle according to claim 1, further comprising:
an operation device for driving mode switching, which is used by the operator to switch between the automated driving mode and the manual driving mode,
wherein the switching controller determines that the automated drive canceling request is submitted when an operation to switch from the automated driving mode to the manual driving mode is performed in response to an operation by the operator with the operation device for driving mode switching.

8. The control apparatus for the vehicle according to claim 1,
wherein the switching controller selects the highest transmission gear among transmission gears having allowable driving forces which are equal to or higher than the predetermined allowable driving force at a current traveling speed of the vehicle.

9. The control apparatus for the vehicle according to claim 8,
wherein the allowable driving force is a difference between a driving force of the vehicle and a travel resistance of the vehicle, the allowable driving force enabling acceleration of the vehicle.

10. A control method of a vehicle capable of switching between an automated driving mode in which, among steering and acceleration-deceleration of the vehicle, at least the acceleration-deceleration is automatically controlled and a manual driving mode in which, among the steering and the acceleration-deceleration of the vehicle, at least the acceleration-deceleration is controlled based on an operation by an operator, wherein the vehicle includes a stepped automatic transmission that changes rotation caused by driving force transmitted from a driving source to output the rotational driving force to a driving wheel side, the control method comprising steps of:

(i) determining by a computer whether an automated drive canceling request to cancel the automated driving mode to switch to the manual driving mode is submitted while the vehicle is traveling in the automated driving mode, and if so;

(ii) switching by the computer a traveling mode of the vehicle from the automated driving mode to the manual driving mode, wherein the step (ii) performs transmission gear setting control in which a transmission gear of the automatic transmission is set to a highest transmission gear among transmission gears within a range of a predetermined allowable driving force when switching the traveling mode of the vehicle from the automated driving mode to the manual driving mode.

* * * * *